United States Patent [19]
McGinnis

[11] Patent Number: 5,368,227
[45] Date of Patent: Nov. 29, 1994

[54] TEMPERATURE LIMITING CONTROL VALVE FOR A SHOWER HEAD

[76] Inventor: Merrill F. McGinnis, 13412 N. 5th Ave., Glendale, Ariz. 85304

[21] Appl. No.: 153,809

[22] Filed: Nov. 16, 1993

[51] Int. Cl.⁵ .............................................. G05D 27/00
[52] U.S. Cl. .................................. 236/92 R; 236/93 B
[58] Field of Search ................... 236/93 B, 93 A, 99 J, 236/92 R

[56] References Cited

U.S. PATENT DOCUMENTS

| | | | |
|---|---|---|---|
| 1,791,811 | 2/1931 | Giesler | 239/93 B |
| 2,534,378 | 12/1950 | Schlaich | 236/93 B |
| 3,368,758 | 2/1968 | Fraser | 239/93 |
| 3,938,741 | 2/1976 | Allison | 239/75 |
| 4,180,208 | 12/1979 | Obermaier | 236/93 B |
| 4,281,790 | 8/1981 | McGinnis | 236/93 B |
| 4,336,903 | 6/1982 | Zirps | 236/99 J X |
| 4,981,261 | 1/1991 | Bergmann et al. | 236/93 B |
| 5,123,593 | 6/1992 | Rundle | 236/93 B |

Primary Examiner—William E. Tapolcai
Attorney, Agent, or Firm—Don J. Flickinger; Robert A. Parsons; Jordan M. Meschkow

[57] ABSTRACT

A temperature limiting control valve for a shower head including a housing having an internal water chamber, a water diversion piston slidably mounted in the internal water chamber, a thermostat mounted in water diversion piston that is closed by a predetermined water temperature in the water chamber with a valve and valve seat being positioned to allow water to flow into the water diversion piston when the valve is in the unseated position and to substantially prevent water from flowing into the water diversion piston when the valve is in the unseated position and to substantially prevent water from flowing into the water diversion piston when the valve is in the seated position, a button mechanically connected to the water diversion piston chamber for resetting the water diversion piston, and an overflow passage external to the housing.

34 Claims, 3 Drawing Sheets

TEMPERATURE LIMITING CONTROL VALVE FOR A SHOWER HEAD

BACKGROUND OF THE INVENTION

1. Field of the Invention

This invention relates to temperature limiting control valves.

More particularly the present invention relates to temperature limiting control valves for shower heads.

In a further and more specific aspect, the instant invention concerns temperature limiting control valves for shower heads which will not allow damage to the bathers skin or injury to the bather, by eliminating the flow of water if the water becomes dangerously hot.

2. Prior Art

Shower heads are well known in prior art. Shower heads, though, can be very dangerous to bathers. These shower heads do not usually protect the bather from fluctuations in the water temperature caused by improper use of the shower controls, variations in the temperature of the hot water in the pipes, cold water use at another outlet in the water system the shower is on, or other causes. Therefore some safety shower device is needed to protect the bather.

There are several types of safety devices available for shower heads but they are generally slow to respond to temperature fluctuations and may, because the device is not particularly rugged, have difficulty over time maintaining the correct alignment of the moving parts needed for continued proper functioning. Also, some of these safety shower head devices do not work when there is a change in the water line pressure, because there is not sufficient pressure to force the mechanical parts to move.

One type of safety device uses a water bypass to divert the water away from the shower head towards a wall or the like protecting the bather. This type of device does not however stop the flow of water. Therefore, there is a chance of injury to the bather from hot water splashing off the wall, from hot water on the floor of the shower, or from the water running over the bather, out of the bypass, while they are trying to adjust the shower controls.

Another type of safety device uses a thermostatic mechanism. This mechanism triggers at a set temperature and stops all the water from flowing out of the shower head, thereby keeping the dangerously hot water away from the bather. Unfortunately, the pressure which forces the water out of the shower head has also been cut-off, when the mechanism reacts correctly, leaving hot water in the shower head. This hot water, therefore, can only leaving the shower head by slowly dripping out, keeping the shower head and the thermostatic mechanism from cooling till either the water in the shower head cools off or all the water drips out. Thus, this type of device interrupts the shower for a long period of time while the bather has to wait for the mechanism to cool down enough to reset.

It would be highly advantageous, therefore, to remedy the foregoing and other deficiencies inherent in the prior art.

Accordingly, it is an object of the present invention to provide a safe temperature limiting control valve for a shower head which will not allow damage to the bathers skin or injury to the bather.

Another object of the invention is the provision of means for stopping water flow when the water becomes dangerously hot.

And another object of the invention is to provide a temperature limiting control valve for a shower head which has a way of diverting the hot water out of the shower head when the water flow is stopped.

Still another object of this invention is the provision of a temperature limiting control valve for a shower head which has a manually controlled reset.

Yet another object of the invention is to provide a temperature limiting control valve for a shower head which does not waste material resources or energy.

Yet still another object of the immediate invention is the provision of a temperature limiting control valve for a shower head which is simple in design and easy to manufacture.

And a further object of the invention is to provide a temperature limiting control valve for a shower head which is inexpensive to produce and purchase.

Still a further object of the invention is the provision of a temperature limiting control valve for a shower head which is ruggedly constructed.

And still another object of the invention is to provide a temperature limiting control valve for a shower head which is efficient in operation.

Yet still a further object of the invention is the provision of a temperature limiting control valve for a shower head which is easy to use and install.

SUMMARY OF THE INVENTION

Briefly, to achieve the desired objects of the invention in accordance with the preferred embodiments thereof, provided is a temperature limiting control valve for a shower head with a housing having an internal water chamber with a water inlet and a water outlet, a water diversion piston slidably mounted in the internal water chamber, a thermostat mounted in the water inlet side of the water diversion piston and having a valve and valve seat, a button mechanically connected to the water diversion piston, and an overflow passage having an inlet in the internal water chamber and an outlet external to the housing.

More specifically, in the first embodiment of the invention, a shower head is attached to the water outlet of the internal water chamber of the housing.

In a further embodiment of the invention, the water outlet of the internal water chamber of the housing is a shower head.

BRIEF DESCRIPTION OF THE DRAWINGS

The foregoing and further and more specific objects and advantages of the instant invention will become readily apparent to those skilled in the art from the following detailed description of the preferred embodiment thereof taken in conjunction with the drawings in which.

DETAILED DESCRIPTION OF THE PREFERRED EMBODIMENT

Figure 1:
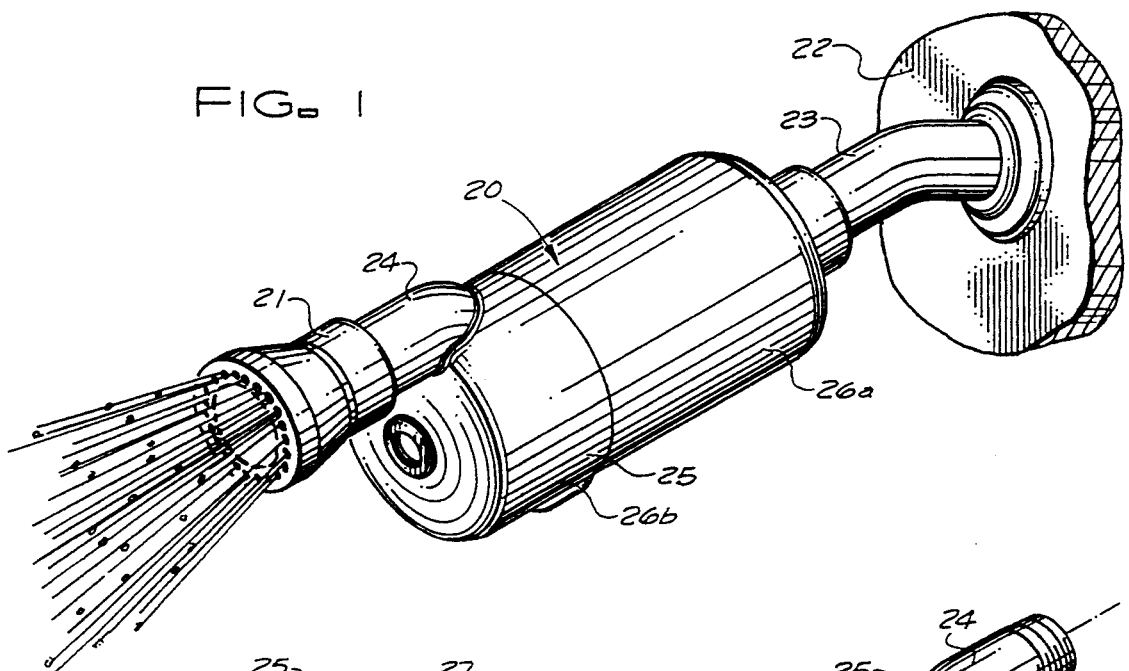
FIG. 1 is a perspective view of a temperature limiting control valve for a shower head attached to a shower head and shower wall.

Turning now to the drawings, in which like reference characters indicate corresponding elements throughout the several views, attention is first directed to FIG. 1 which illustrates a temperature limiting control valve 20 for a shower head 21 attached to a wall of the shower 22 by a shower arm 23. Shower head 21 is attached to temperature limiting control valve 20 by a water outlet passage 24, where outlet passage 24 is an integral part of temperature limiting control valve 20. Water enters temperature limiting control valve 20 through shower arm 23 and exits through shower head 21, unless the temperature of the water entering temperature limiting control valve 20 is higher than the predetermined temperature, as will be discussed further on.

Figure 4:
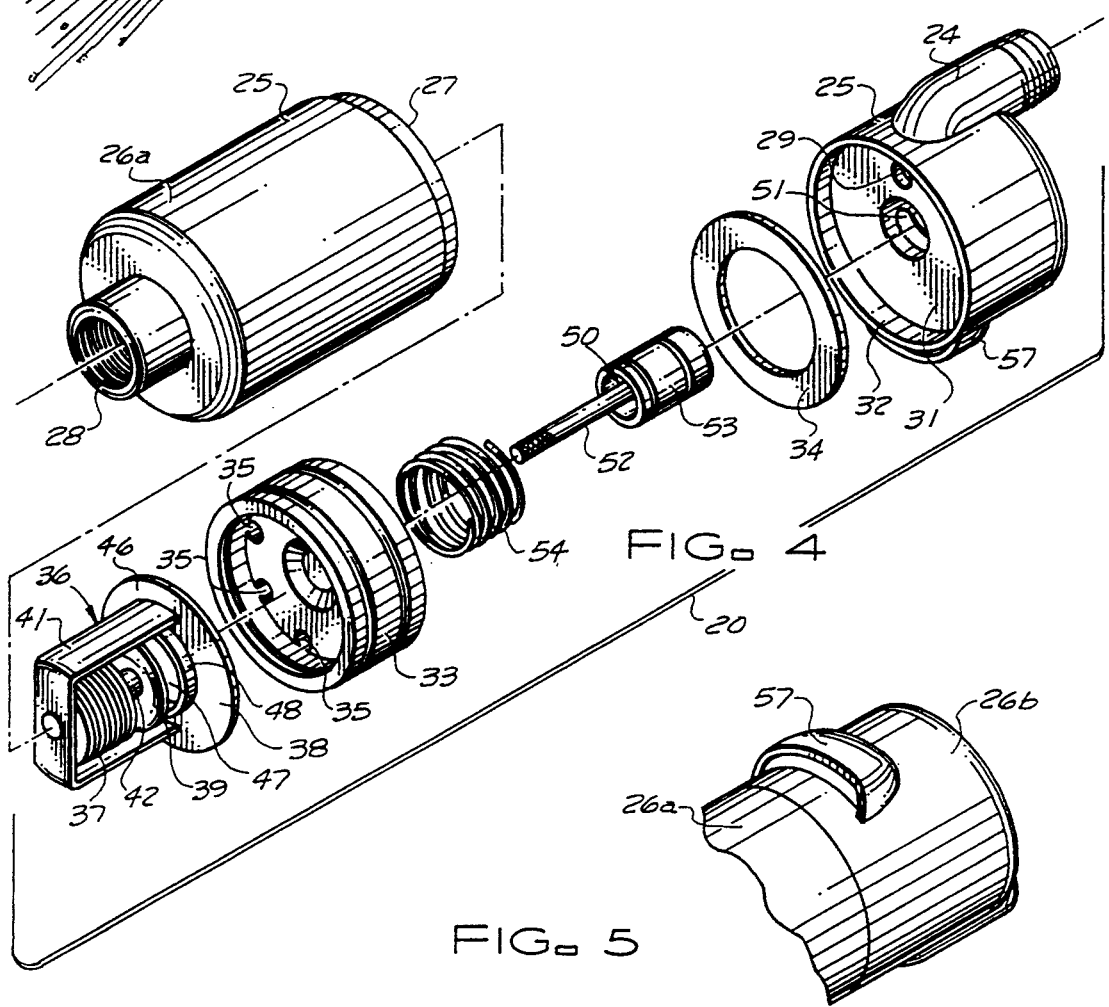
FIG. 4 is an exploded perspective view of the temperature limiting control valve of FIG. 1, embodying the present invention.
Figure 2:
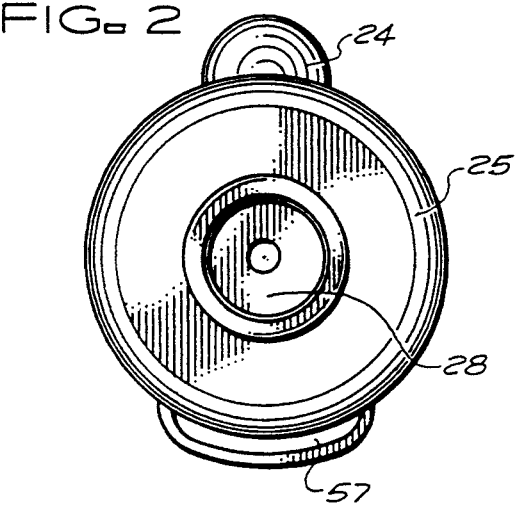
FIG. 2 is a front plane view of the temperature limiting control valve of FIG. 1.
Figure 3:
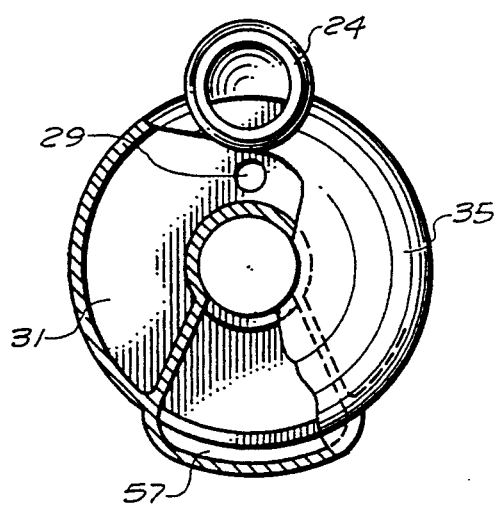
FIG. 3 is a front plane view of the temperature limiting control valve of FIG. 1, portions thereof broken away and shown in section.

Temperature limiting control valve 20, as illustrated in FIG. 2, 3, and 4, includes a housing 25 having a first and a second mating portions 26a and 26b defining a cylindrical internal water chamber 27 with a water inlet 28, at one end, as illustrated in FIG. 2, and a water outlet 29, at the other end. Water inlet 28 is a cylindrically shaped ring with internal threads for affixing temperature limiting control valve 20 to shower arm 23. Water outlet 29 is a hole extending through an end plate 31 of second portion 26b of housing 25 from internal water chamber 27 to outlet passage 24, as further illustrated in FIG. 3. A water diversion piston 33 is mounted in water chamber 27 for axially slidable movement between an open and closed position, where in the closed position water diversion piston 33 rests against a gasket 34 on end plate 31. Water diversion piston 33 is disc-shaped having a water inlet side and a water outlet side, and a plurality of passages or holes 35 extending therethrough to allow the water to flow from the inlet side of water diversion piston 33 through to the outlet side of water diversion piston 33. In this specific embodiment water diversion piston 33 has eight holes 35 extending therethrough.

Mounted in the water inlet side of water diversion piston 33 is a thermostat 36. Thermostat 36 is of a bellows type with a bellows 37 which expands at a predetermined temperature, in this embodiment bellows 37 is made of phosphor bronze, but it should be understood that any material with a similar temperature sensitivity may be used. Bellows 37 is attached, at one end, to a circular valve seat 38 by a U-shaped bracket 41 and attached at the other end to a valve 39 by a peg 42. Valve seat 38 is a plate 46 with a hole 47 in the center, surrounded by a shoulder 48. Valve 39 is dish shaped with sufficient circumference to rest on shoulder 48 while completely covering hole 47 in valve seat 38 to prevent the flow of water through hole 47. Valve seat 38 and valve 39 are positioned to allow water to flow through hole 47 of valve seat 38 into the water inlet side of water diversion piston 33 when valve 39 is in an unseated position and to substantially prevent the flow of water through hole 47 of valve seat 38 when valve 39 is in a seated position.

Figure 5:
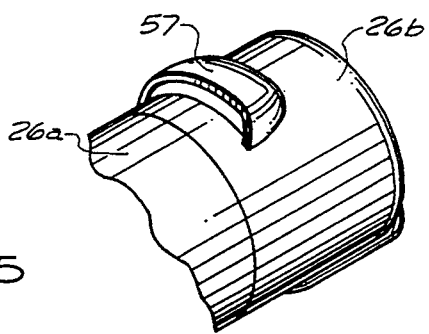
FIG. 5 is a perspective view of the underside of the temperature limiting control valve of FIG. 1 showing an overflow passage, portions thereof broken away.

Mechanically connected to the water outlet side of water diversion piston 33 is a button 50, where button 50 is in a retracted position when water diversion piston 33 is in the open position and where button 50 is in an extended position when water diversion piston 33 is in the closed position, and button 50 is externally accessible through an opening 51 in housing 25 in the extended position. Button 50 includes a shaft 52 attached to water diversion piston 33, at one end and a cylindrical cap 53 affixed to the other end. Shaft 52 is inserted into a spring 54, where spring 54 sits between water diversion piston 33 and end plate 31. An overflow passage 57 extends through the bottom of second mating portion 26b of housing 25 and has an inlet in internal water chamber 27 and an outlet external to housing 25, as illustrated in FIG. 5.

Figure 6:
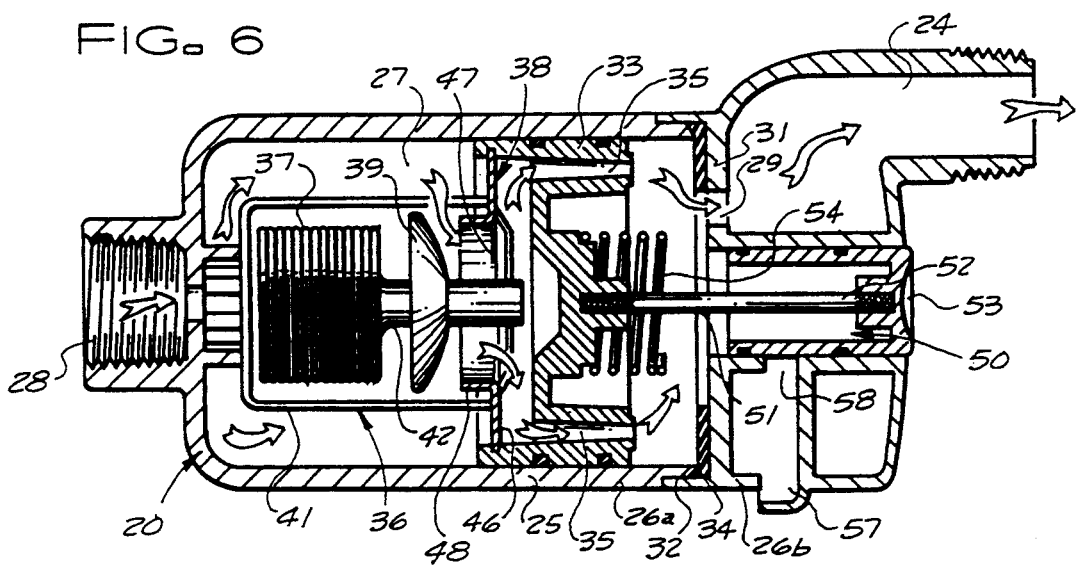
FIG. 6 is a cross-sectional view of the temperature limiting control valve of FIG. 1 in an open position.
Figure 7:
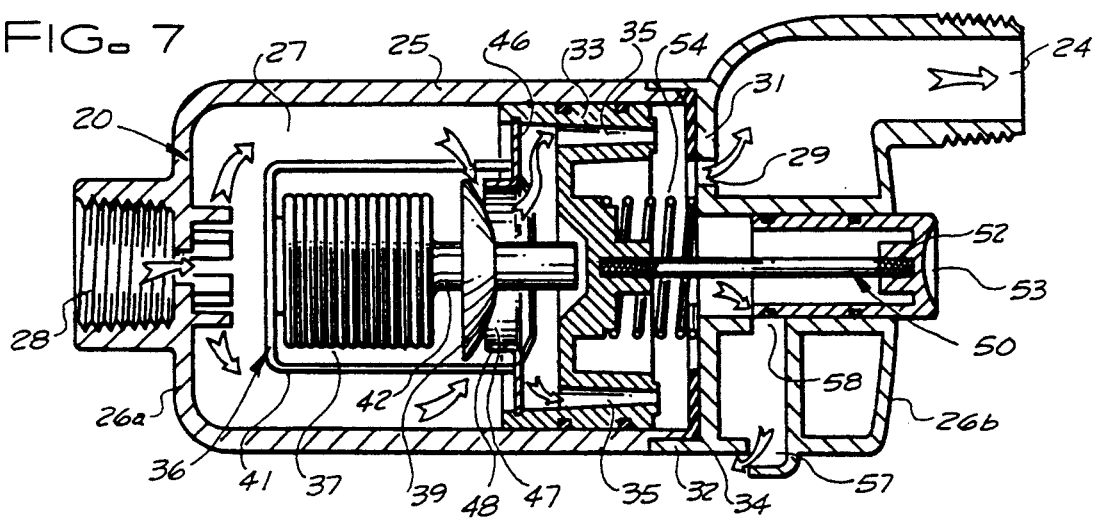
FIG. 7 is a cross-sectional view of the temperature limiting control valve of FIG. 1 in an intermediate position between the open and closed positions.
Figure 8:
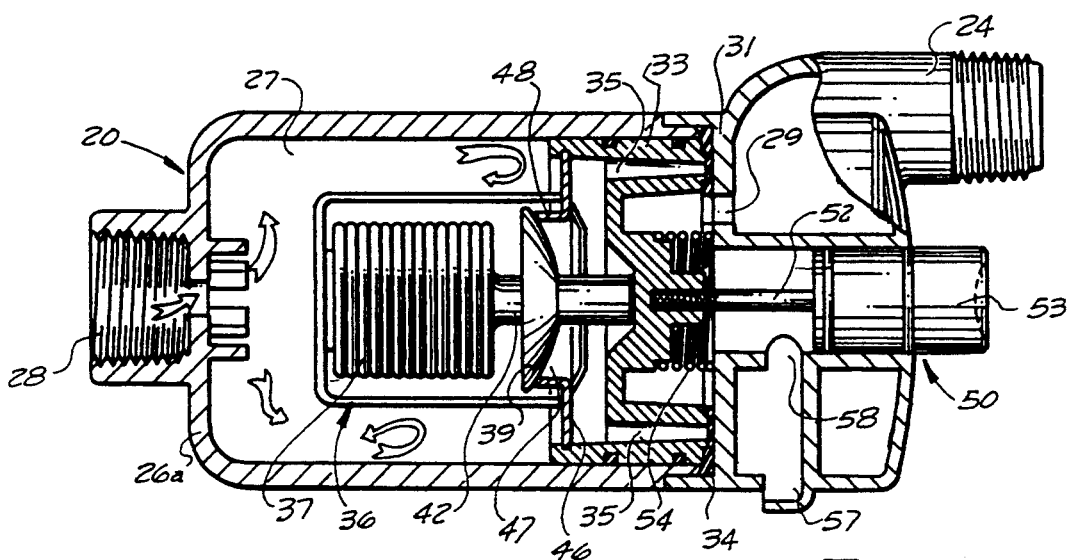
FIG. 8 is a cross-sectional view of the temperature limiting control valve of FIG. 1 in the closed position.

The flow of water through temperature limiting control valve 20 and the movement of parts of temperature limiting control valve 20 while in various stages of an open and a closed position, is illustrated in FIGS. 6, 7 and 8. In this embodiment it takes approximately 1.5 seconds for temperature limiting control valve 20 to go from an open to a closed position if the predetermined temperature (approximately 110 degrees Fahrenheit in this embodiment) is reached by the water flowing through temperature limiting control valve 20. Temperature limiting control valve 20 is illustrated in FIG. 6 in an open position, allowing water to flow through water inlet 28 of housing 25 into internal chamber 27, where the water flows around bellows 37 of thermostat 36 and through hole 47 of valve seat 38, with valve 39 in the unseated position. Then the water flows through holes 35 of water diversion piston 33 around spring 54 and shaft 52 of button 50, in the retracted position, and out water outlet 29 through outlet passage 24 and into shower head 21. When button 50 is in the retracted position, cap 53 of button 50 blocks an outlet 58 of overflow passage 57 preventing the flow of water out of overflow passage 57.

Temperature limiting control valve 20 is illustrated in FIG. 7 in an intermediate position between open and closed, where the water in internal chamber 27, is of the predetermined temperature. The water flows around bellows 37 of thermostat 36 and bellows 37 starts to expand. As bellows 37 expands valve 39 is pushed towards valve seat 38, which starts restricting the water flow through hole 47 of valve seat 38 and increases the pressure inside internal water chamber 27 behind water diversion piston 33, which forces water diversion piston 33 to slide towards end plate 31 of housing 25. When water diversion piston 33 slides, it forces button 50 into the extended position, compressing spring 54 and moving cap 53 of button 50, which starts to unblock outlet 58 of overflow passage 57 letting water flow out of overflow passage 57 and lessening the flow of water through water outlet 29 of housing 25 to shower head 21.

Water is prevented from flowing through temperature limiting control valve 20 in FIG. 8. Bellows 37 of thermostat 36 is in a fully extended position with valve 39 in the seated position in valve seat 38, substantially preventing the flow of water through hole 47 of valve seat 38, causing enough pressure to hold water diversion piston 33 in a closed position resting against gasket 34 on end plate 31 of housing 25. Holes 35 of water diversion piston 33 rest against gasket 34 on end plate 31 of housing 25, when water diversion piston 33 is in the closed position, further preventing the flow of water into water outlet 29 of housing 25. With water diversion piston 33 in the closed position, button 50 is fully extended unblocking outlet 58 of overflow passage 57 letting the water in shower head 21 flow out of overflow passage 57 and stopping the flow of water through shower head 21. When button 50 is in the extended position and spring 54 is compressed, temperature limiting control valve 20 can be reset manually by pushing button 50. Pushing button 50 moves it to the retracted position and simultaneously moves water diversion piston 33 manually to the open position illustrated in FIG. 6.

Figure 10:
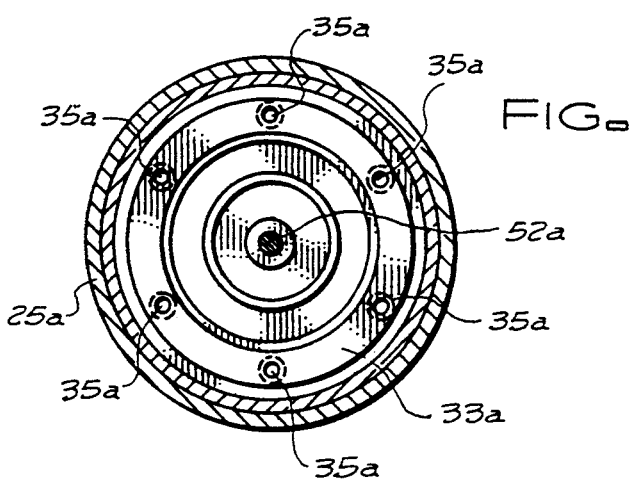
FIG. 10 is a cross-sectional view of the temperature limiting control valve of FIG. 9.
Figure 9:
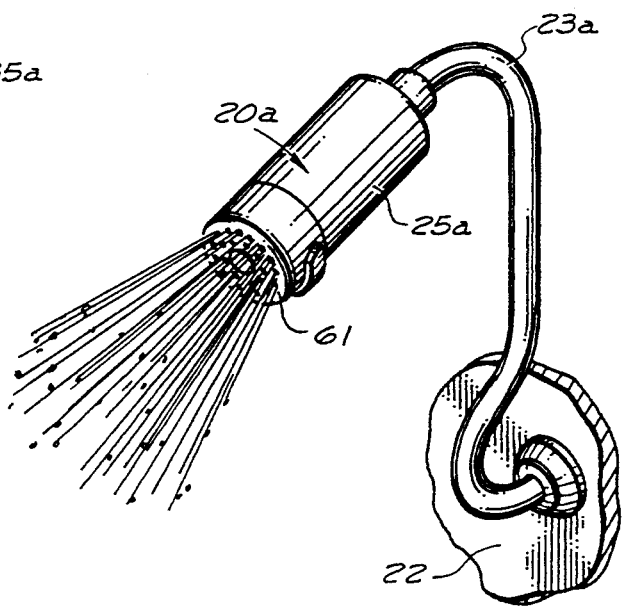
FIG. 9 is a perspective view of another embodiment of a temperature limiting control valve.
Figure 11:
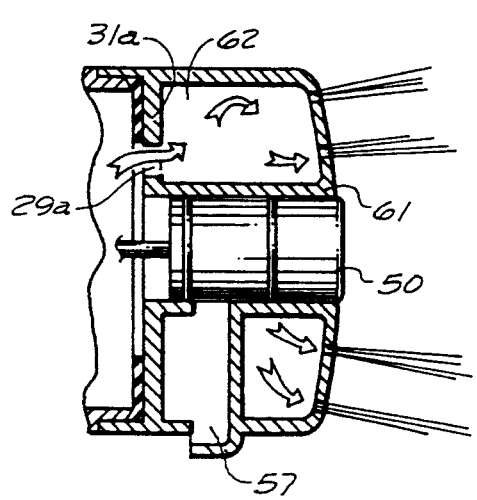
FIG. 11 is a cross-sectional view, portions thereof broken away, of the temperature limiting control valve of FIG. 9.

Another embodiment of a temperature limiting control valve 20a is illustrated in FIGS. 9, 10 and 11. In this embodiment the shower head is part of temperature limiting control valve 20a as illustrated in FIG. 9. Instead of outlet passage 24 attached to shower head 21 of temperature limiting control valve 20, temperature limiting control valve 20a has a shower face 61 integrally affixed to end plate 31a of housing 25a. Another embodiment of water diversion piston 33a is illustrated in FIG. 10 wherein six holes 35a are utilized instead of the eight holes 35 of water diversion piston 33 in FIG. 4. The water flows directly from water outlet 29a of housing 25a into a cavity 62, between end plate 31a and shower face 61, and then out from shower face 61, as illustrated in FIG. 11.

As can be seen from the description of the instant invention, the present invention provides a temperature limiting control valve of simple design, which stops water flow when the water becomes dangerously hot and diverts the hot water out of the shower head when the water flow is stopped so that the hot water will not injury to the bather or the bathers skin. Material resources and energy are not wasted by the instant invention because the temperature limiting control valve is efficient and can be manually reset. The present invention, also, provides a rugged temperature limiting control valve which is easy to manufacture, install, and use while being inexpensive to produce and purchase.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

I claim:

1. A temperature limiting control valve for a shower head comprising:
  a housing having an internal water chamber with a water inlet and outlet;
  a water diversion piston slidably mounted in the internal water chamber for movement between an open and a closed position, the piston having a water inlet side and water outlet side;
  a thermostat mounted in the water inlet side of the water diversion piston and having a valve and valve seat with the valve being unseated when the thermostat is open and seated against the valve seat when the thermostat is closed by a predetermined water temperature in the water chamber, the valve and valve seat being positioned to allow water to flow into the water inlet of the water diversion piston when the valve is in the unseated position and to substantially prevent water from flowing into the water diversion piston when the valve is in the seated position;
  a button mechanically connected to the water diversion piston having a first position when the water diversion piston is in the open position and a second position when the water diversion piston is in the closed position; and
  an overflow passage having an inlet in the internal water chamber and an outlet external to the housing, and the button being positioned to close the inlet of the overflow passage in the first position and open the inlet of the water overflow passage in the second position.

2. A temperature limiting control valve for a shower head claimed in claim 1 wherein the internal water chamber is cylindrically shaped.

3. A temperature limiting control valve for a shower head claimed in claim 2 wherein the internal water chamber has a plate defining the water outlet for engagement of the water diversion piston, when the water diversion piston is in the closed position.

4. A temperature limiting control valve for a shower head claimed in claim 1 wherein a shower head is attached to the water outlet.

5. A temperature limiting control valve for a shower head claimed in claim 1 wherein the water outlet is in the form of a shower head.

6. A temperature limiting control valve for a shower head claimed in claim 1 wherein the thermostat is attached to the water inlet side of the water diversion piston and the button is attached to the water outlet side of the water diversion piston.

7. A temperature limiting control valve for a shower head claimed in claim 1 wherein the water diversion piston is generally disc shaped.

8. A temperature limiting control valve for a shower head claimed in claim 7 wherein the water diversion piston is axially mounted in the internal water chamber.

9. A temperature limiting control valve for a shower head claimed in claim 8 wherein the water diversion piston is axially slidable in the internal water chamber.

10. A temperature limiting control valve for a shower head claimed in claim 9 wherein the water diversion piston has a plurality of holes to allow water to flow through, which are sealable against a gasket on the plate of the housing when the water diversion piston is in the closed position.

11. A temperature limiting control valve for a shower head claimed in claim 10 wherein the water diversion piston has eight holes.

12. A temperature limiting control valve for a shower head claimed in claim 1 wherein the thermostat is of a bellows-type.

13. A temperature limiting control valve for a shower head claimed in claim 12 wherein the thermostat is made of phosphor-bronze.

14. A temperature limiting control valve for a shower head claimed in claim 1 wherein the button is cylindrically shaped.

15. A temperature limiting control valve for a shower head claimed in claim 1 wherein the first position of the button is a retracted position and the second position of the button is an extended position, and the button is externally accessible through the housing in the extended position.

16. A temperature limiting control valve for a shower head claimed in claim 15 wherein the water diversion piston has a spring attached to help reset the water diversion piston when the button is repositioned into the retracted position.

17. A temperature limiting control valve for a shower head comprising:

a housing having an internal water chamber with a water inlet and outlet;

a water diversion piston slidably mounted in the internal water chamber of the housing for movement between an open and a closed position, the piston having a water inlet and water outlet;

a bellows-type thermostat mounted in the water inlet of the water diversion piston and having a valve and valve seat with the valve being unseated when the thermostat is open and seated against the valve seat when the thermostat is closed by a predetermined water temperature in the water chamber, the valve and valve seat being positioned to allow water to flow into the water inlet of the water diversion piston when the valve is in the unseated position and to substantially prevent water from flowing into the water diversion piston when the valve is in the seated position;

a cylinder-like button mechanically connected to the water diversion piston having a first, retracted, position when the water diversion piston is in the open position and a second, extended, position when the water diversion piston is in the closed position, and the button being externally accessible through an opening in the housing when in the extended position; and an overflow passage extending through the housing and having an inlet in the internal water chamber and an outlet external to the housing, and the cylinder-like button being positioned to close the inlet of the overflow passage in the first position and open the inlet of the water overflow passage in the second position.

18. A temperature limiting control valve for a shower head claimed in claim 17 wherein the internal water chamber is cylindrically shaped.

19. A temperature limiting control valve for a shower head claimed in claim 18 wherein the internal water chamber has a plate defining the water outlet for engagement of the water diversion piston, when the water diversion piston is in the closed position.

20. A temperature limiting control valve for a shower head claimed in claim 17 wherein a shower head is attached to the water outlet.

21. A temperature limiting control valve for a shower head claimed in claim 17 wherein the water outlet is in the form of a shower head.

22. A temperature limiting control valve for a shower head claimed in claim 17 wherein the thermostat is attached to the water inlet side of the water diversion piston and the button is attached to the water outlet side of the water diversion piston.

23. A temperature limiting control valve for a shower head claimed in claim 17 wherein the water diversion piston is generally disc shaped.

24. A temperature limiting control valve for a shower head claimed in claim 23 wherein the water diversion piston is axially mounted in the internal water chamber.

25. A temperature limiting control valve for a shower head claimed in claim 24 wherein the water diversion piston is axially slidable in the internal water chamber.

26. A temperature limiting control valve for a shower head claimed in claim 25 wherein the water diversion piston has a plurality of holes to allow water to flow through, which are sealable against a gasket on the plate of the housing when the water diversion piston is in the closed position.

27. A temperature limiting control valve for a shower head claimed in claim 26 wherein the water diversion piston has eight holes.

28. A temperature limiting control valve for a shower head claimed in claim 17 wherein the thermostat is made of phosphor-bronze.

29. A temperature limiting control valve for a shower head claimed in claim 17 wherein the water diversion piston has a spring attached to help to reset the water diversion piston when the button is repositioned into the retracted position.

30. A temperature limiting control valve for a shower head comprising:

a housing having a cylindrically-shaped internal water chamber with a water inlet and outlet, and having a plate defining the water outlet for engagement of the water diversion piston, when the water diversion piston is in the closed position;

a disc-shaped water diversion piston axially slidably mounted in the internal water chamber of the housing for movement between an open and a closed position, the piston having a water inlet side and a water outlet side and having eight holes to allow water to flow through, which are sealable against a gasket on the plate of the housing when the water diversion piston is in the closed position;

a bellows-type thermostat mounted in the water inlet of the water diversion piston and having a valve and valve seat with the valve being unseated when the thermostat is open and seated against the valve seat when the thermostat is closed by a predetermined water temperature in the water chamber, the valve and valve seat being positioned to allow water to flow into the water inlet of the water diversion piston when the valve is in the unseated position and to substantially prevent water from flowing into the water diversion piston when the valve is in the seated position;

a cylinder-like button mechanically connected to the water diversion piston having a first, retracted, position when the water diversion piston is in the open position and a second, extended, position when the water diversion piston is in the closed position, and the button being externally accessible through an opening in the housing when in the extended position where the water diversion piston having a spring attached helps reset the water diversion piston when the button is repositioned into the retracted position; and an overflow passage extending through the housing and having an inlet in the internal water chamber and an outlet external to the housing, and the cylinder-like button being positioned to close the inlet of the overflow passage in the first position and open the inlet of the water overflow passage in the second position.

31. A temperature limiting control valve for a shower head claimed in claim 30 wherein the thermostat is made of phosphor-bronze.

32. A temperature limiting control valve for a shower head claimed in claim 30 wherein a shower head is attached to the water outlet.

33. A temperature limiting control valve for a shower head claimed in claim 30 wherein the water outlet is in the form of a shower head.

34. A temperature limiting control valve for a shower head claimed in claim 30 wherein the predetermined temperature is 110 degrees Fahrenheit.

* * * * *

UNITED STATES PATENT AND TRADEMARK OFFICE
CERTIFICATE OF CORRECTION

PATENT NO. : 5,368,227
DATED : 29 November 1994
INVENTOR(S) : Merrill F. McGinnis It is certified that error appears in the above-indentified patent and that said Letters Patent is hereby corrected as shown below:

On the title page, item [76]
In the Inventor's Address: the street address should read
--13412 N. 54th Ave., Glendale, Ariz. 85304-- instead of
"13412 N. 5th Ave., Glendale, Ariz. 85304".

Signed and Sealed this

Twenty-eight Day of February, 1995

Attest:

BRUCE LEHMAN

*Attesting Officer*  *Commissioner of Patents and Trademarks*